(12) United States Patent
Barnes

(10) Patent No.: US 7,409,137 B2
(45) Date of Patent: Aug. 5, 2008

(54) SLIDE ARRANGEMENT FOR CABLE DRAWER

(75) Inventor: Kathleen M. Barnes, Golden Valley, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 9 days.

(21) Appl. No.: 11/543,457

(22) Filed: Oct. 4, 2006

(65) Prior Publication Data

US 2008/0085092 A1    Apr. 10, 2008

(51) Int. Cl.
*G02B 6/00* (2006.01)

(52) U.S. Cl. .................. 385/135; 74/110; 312/331; 312/334.1; 312/334.5; 312/332.1

(58) Field of Classification Search .............. 385/135; 74/110; 312/331–334
See application file for complete search history.

(56) References Cited

U.S. PATENT DOCUMENTS

| | | | |
|---|---|---|---|
| 2,805,106 A | 9/1957 | Penkala | |
| 4,070,076 A | 1/1978 | Zwillinger | |
| 4,373,776 A | 2/1983 | Purdy | |
| 4,737,039 A | 4/1988 | Sekerich | |
| 4,792,203 A | 12/1988 | Nelson et al. | |
| 4,820,007 A | 4/1989 | Ross et al. | |
| 4,840,449 A | 6/1989 | Ghandeharizadeh | |
| 4,898,448 A | 2/1990 | Cooper | |
| 4,971,421 A | 11/1990 | Ori | |
| 4,995,688 A | 2/1991 | Anton et al. | |
| 5,066,149 A | 11/1991 | Wheeler et al. | |
| 5,127,082 A | 6/1992 | Below et al. | |
| 5,167,001 A | 11/1992 | Debortoli et al. | |
| 5,240,209 A | 8/1993 | Kutsch | |
| 5,247,603 A | 9/1993 | Vidacovich et al. | |
| 5,275,064 A * | 1/1994 | Hobbs ........................ | 74/110 |
| 5,285,515 A | 2/1994 | Milanowski et al. | |
| 5,323,480 A | 6/1994 | Mullaney et al. | |
| 5,339,379 A | 8/1994 | Kutsch et al. | |
| 5,497,444 A | 3/1996 | Wheeler | |
| 5,511,144 A | 4/1996 | Hawkins et al. | |
| 5,802,237 A | 9/1998 | Pulido | |
| 5,811,055 A | 9/1998 | Geiger | |
| 5,882,100 A | 3/1999 | Rock | |
| 5,917,984 A | 6/1999 | Roseler et al. | |
| 5,946,440 A | 8/1999 | Puetz | |
| 5,966,492 A | 10/1999 | Bechamps et al. | |

(Continued)

FOREIGN PATENT DOCUMENTS

DE        29 18 309 A1      11/1980

(Continued)

*Primary Examiner*—Frank G Font
*Assistant Examiner*—Guy G Anderson
(74) *Attorney, Agent, or Firm*—Merchant & Gould P.C.

(57) ABSTRACT

A drawer slide having first and second outer rails interconnected to center rails; each of the center rails interconnected to a hub rail. The drawer slide is configured for use with a cable management panel having a drawer and a chassis. The drawer slide can be mounted to the drawer to provide extended sliding movement from a closed position to an open position in only a first direction. The drawer slide can also be mounted to the drawer to provide sliding movement from a closed position to an open position in both of either a first direction and a second opposite direction.

35 Claims, 9 Drawing Sheets

U.S. PATENT DOCUMENTS

| | | | |
|---|---|---|---|
| 6,076,908 | A | 6/2000 | Maffeo |
| 6,215,938 | B1 | 4/2001 | Reitmeier et al. |
| 6,236,795 | B1 | 5/2001 | Rodgers |
| 6,301,424 | B1 | 10/2001 | Hwang |
| 6,438,310 | B1 | 8/2002 | Lance et al. |
| 6,504,988 | B1 | 1/2003 | Trebesch et al. |
| 6,677,520 | B1 | 1/2004 | Kim et al. |
| 6,715,619 | B2 | 4/2004 | Kim et al. |
| 6,748,155 | B2 | 6/2004 | Kim et al. |
| 6,804,447 | B2 | 10/2004 | Smith et al. |
| 6,865,331 | B2 | 3/2005 | Mertesdorf |
| 6,945,620 | B2 | 9/2005 | Lam et al. |
| 2003/0007767 | A1 | 1/2003 | Douglas et al. |
| 2003/0165315 | A1 | 9/2003 | Trebesch et al. |
| 2004/0013390 | A1 | 1/2004 | Kim et al. |
| 2004/0136676 | A1 | 7/2004 | Mertesdorf |
| 2004/0258384 | A1 | 12/2004 | Trebesch et al. |
| 2005/0025444 | A1* | 2/2005 | Barnes et al. ............... 385/135 |
| 2005/0078929 | A1* | 4/2005 | Iwanek ....................... 385/135 |

FOREIGN PATENT DOCUMENTS

| | | |
|---|---|---|
| DE | 38 36 273 A1 | 4/1990 |
| WO | WO 03/005095 A2 | 1/2003 |

\* cited by examiner

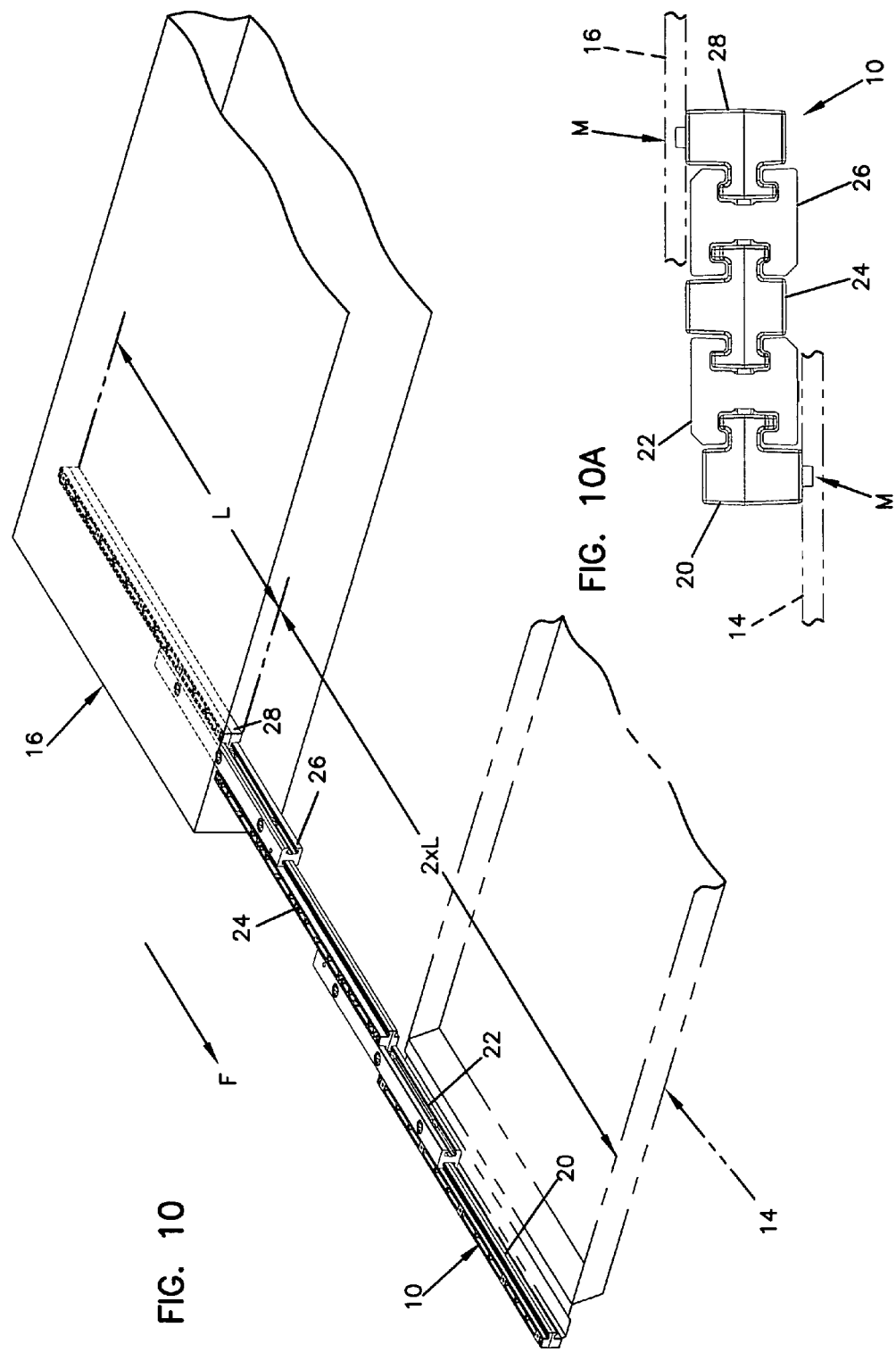

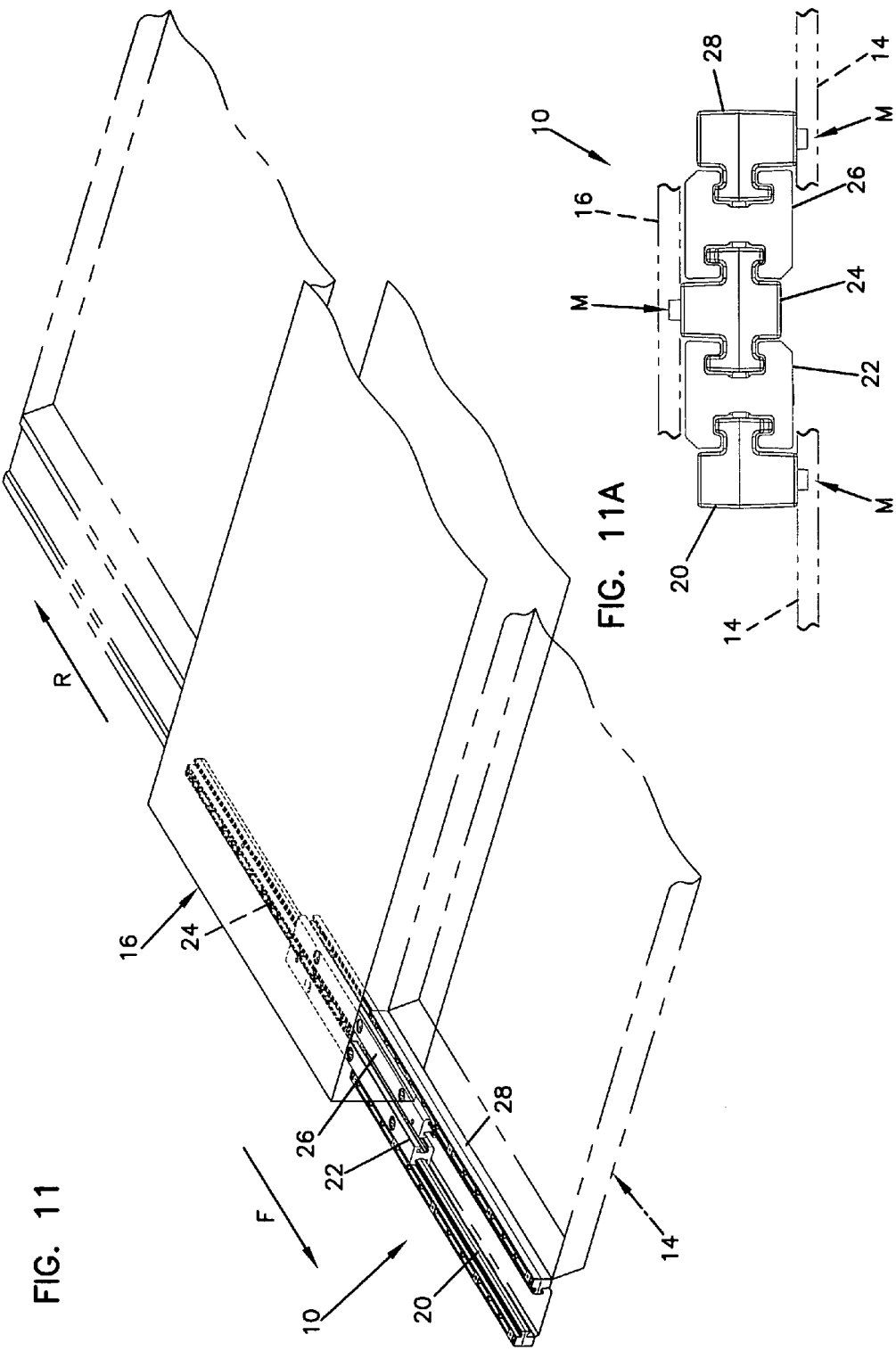

SLIDE ARRANGEMENT FOR CABLE DRAWER

TECHNICAL FIELD

This disclosure relates to the management of fiber optic cables. In particular, this disclosure relates to cable drawers used in the telecommunications industry for storage of fiber optic cables.

BACKGROUND

Cable storage drawers and associated drawer devices are used to prevent unnecessary or excessive displacement of optical fibers. Examples of known drawer and drawer devices are disclosed in U.S. Pat. Nos. 5,066,149 and 6,504,988, and U.S. Publication No. 2005/0025444; each of which is incorporated herein by reference.

Cable storage drawers generally include a number of drawer devices located within an interior of the drawer. The drawer is interconnected to a sliding arrangement that permits sliding movement of the drawer relative to an enclosure or chassis. Sliding the drawer from a closed position to an open position, relative to the chassis, provides access the drawer devices. In general, improvement has been sought with respect to drawer sliding arrangements, generally to accommodate better, and more adaptable access to an interior of a drawer.

SUMMARY

The present invention relates to a drawer slide that provides sliding movement of a drawer relative to a telecommunications chassis. In one aspect, the invention concerns a slide that permits a drawer to travel a distance 2-times the retracted length of the slide. In another aspect, the invention concerns a slide that permits a drawer to travel in both a forward direction and a rearward direction. In yet another aspect, the invention concerns a slide that can be mounted in both of either a first mounting configuration and a second mounting configuration. In the first mounting configuration, that drawer can slide an extended distance outward from the chassis in a first direction. In the second mounting configuration, the drawer can slide outward from the chassis in both of either a first direction and a second opposite direction.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 10 is a front perspective view of the drawer slide of FIG. 2, shown in use with a drawer in a first mounting configuration;

FIG. 10A is a front elevation view of the drawer slide of FIG. 2 showing the first mounting configuration of FIG. 10;

FIG. 11 is a front perspective view of the drawer slide of FIG. 2, shown in use with a drawer in a second mounting configuration, the drawer moved in a forward direction;

FIG. 11A is a front elevation view of the drawer slide of FIG. 2 showing the second mounting configuration of FIG. 11;

DETAILED DESCRIPTION

Reference will now be made in detail to various features of the present disclosure that are illustrated in the accompanying drawings. Wherever possible, the same reference numbers will be used throughout the drawings to refer to the same or like parts. The drawings illustrate drawer slides having features that are examples of how inventive aspects in accordance with the principles of the present disclosure may be practiced. Preferred features are adapted for providing better and more adaptable access to an interior of a drawer.

Figure 1:
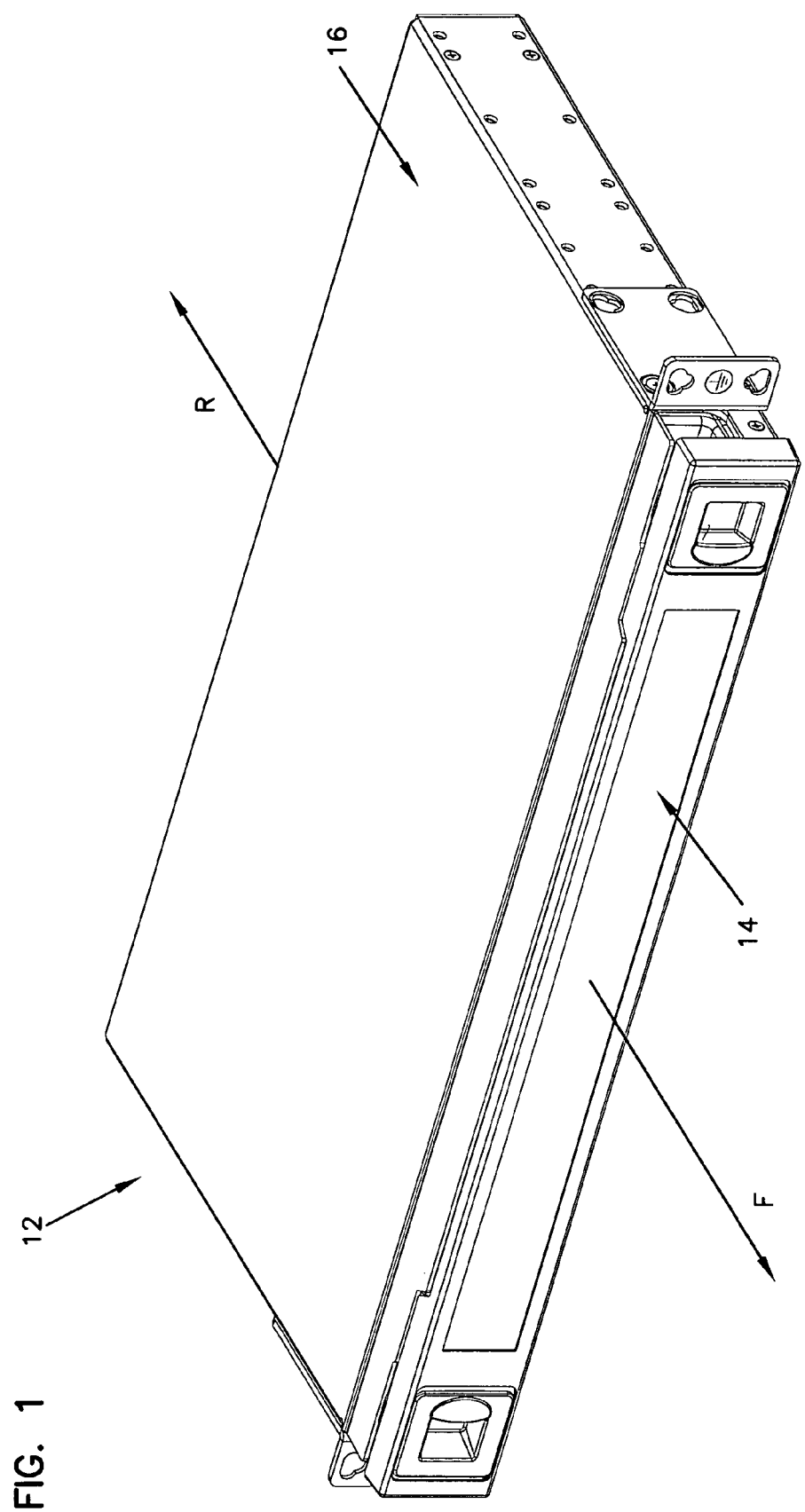
FIG. 1 is a front perspective view of a drawer arrangement.

FIG. 1 illustrates one embodiment of a cable management panel or module 12 having a drawer slide 10 (FIG. 2) in accordance with the present disclosure. The module 12 is constructed to mount to a rack, cabinet, enclosure, or other mounting fixture (not shown). In some applications, a number of modules 12 incorporating the features of the present disclosure can be mounted to a rack or enclosure to provide a system of cable management modules 12.

Figure 2:
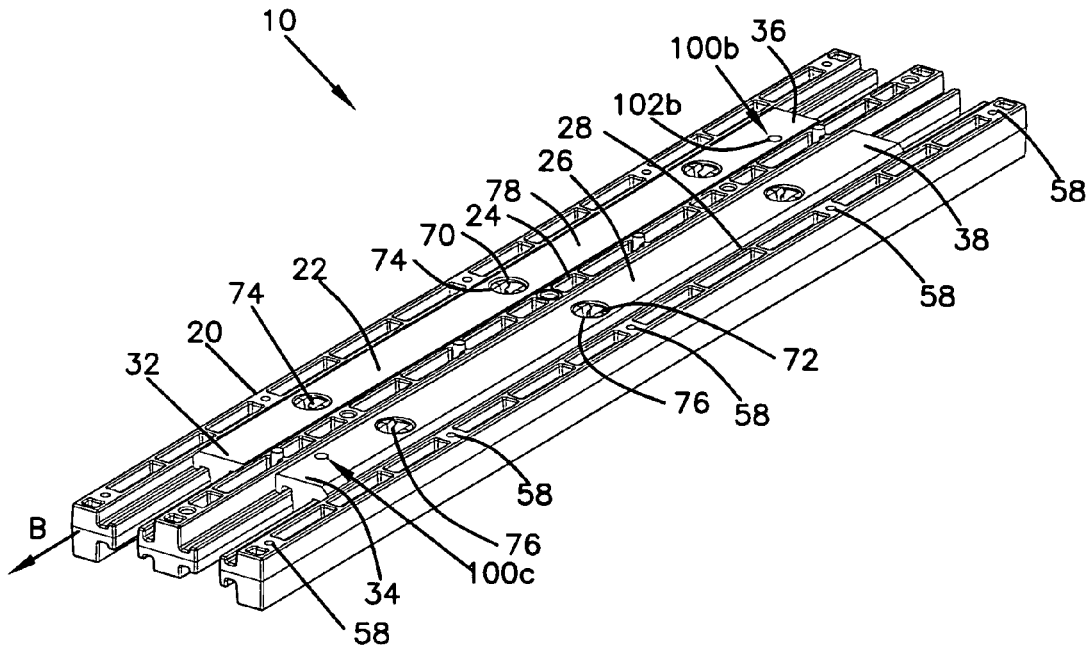
FIG. 2 is a top perspective view of one embodiment of a drawer slide, according to the principles of the present disclosure, which can be used in the drawer arrangement of FIG. 1.

As shown in FIG. 1, the module 12 generally includes a drawer 14 and a chassis 16. The drawer 14 is configured to slide relative to the chassis 16 by operation of the drawer slide 10 (FIG. 2). That is, the drawer 14 is generally configured to slide outward from a closed position (as shown) to an open position to provide access to an interior of the drawer 14. Typically, the module 12 is oriented such that the drawer 14 slides out horizontally from the chassis 16.

The drawer 14 and chassis 16 are sized for containing cable management or distribution structures. Examples of distribution structures include devices for storing cables, or for connecting cables to other cables and/or other fiber optic devices. In particular, distribution structures and devices can include radius limiters, attenuators, couplers, switches, wave divisions multiplexers, splitters, combiners, and splices, for example.

Figure 3:
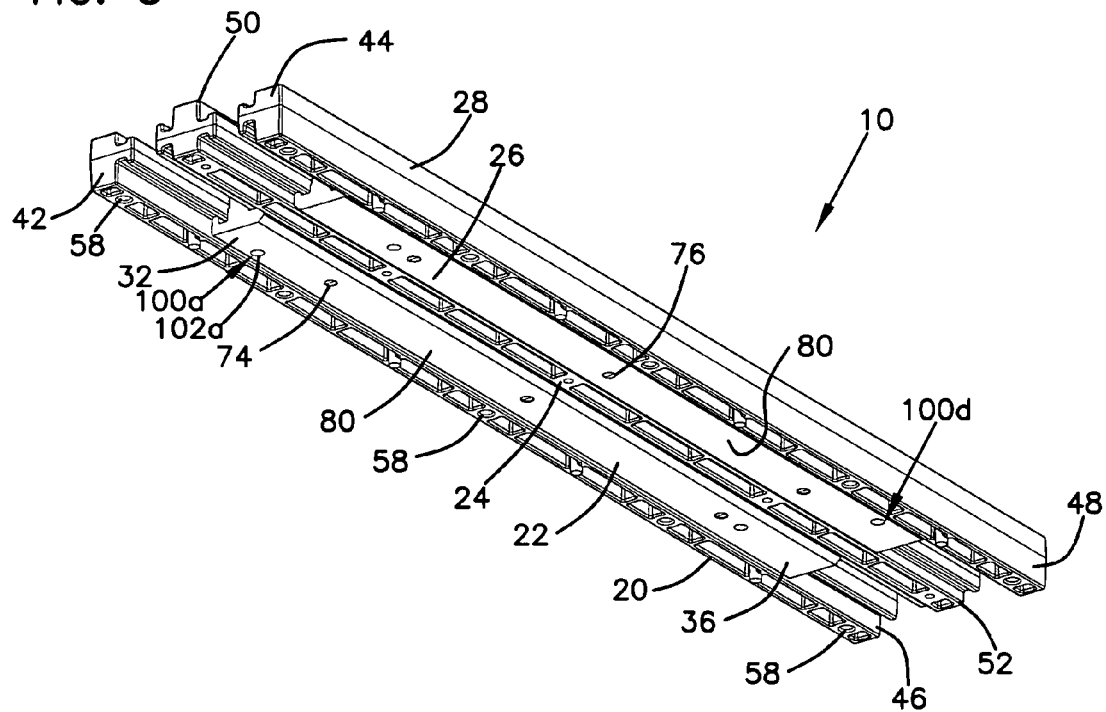
FIG. 3 is a bottom perspective view of the drawer slide of FIG. 2.

Referring now to FIGS. 2 and 3, the drawer slide 10 of the present disclosure includes at least five slide members. While the illustrated drawer slide 10 includes only five slide members, a greater number of slide members can be provided in accordance with the principles disclosed. The five slide members of the drawer slide 10 include: a first outer rail or side rail 20, a first center rail 22, a hub rail 24, a second center rail 26, and a second outer rail or side rail 28. The five slide members are slidably interconnected to one another. In particular, each of the first and second side rails 20, 28 is respectively interconnected to the first and second center rails 22, 26; and each of the first and second center rails 22, 26 is interconnected to the hub rail 24.

Figure 4:
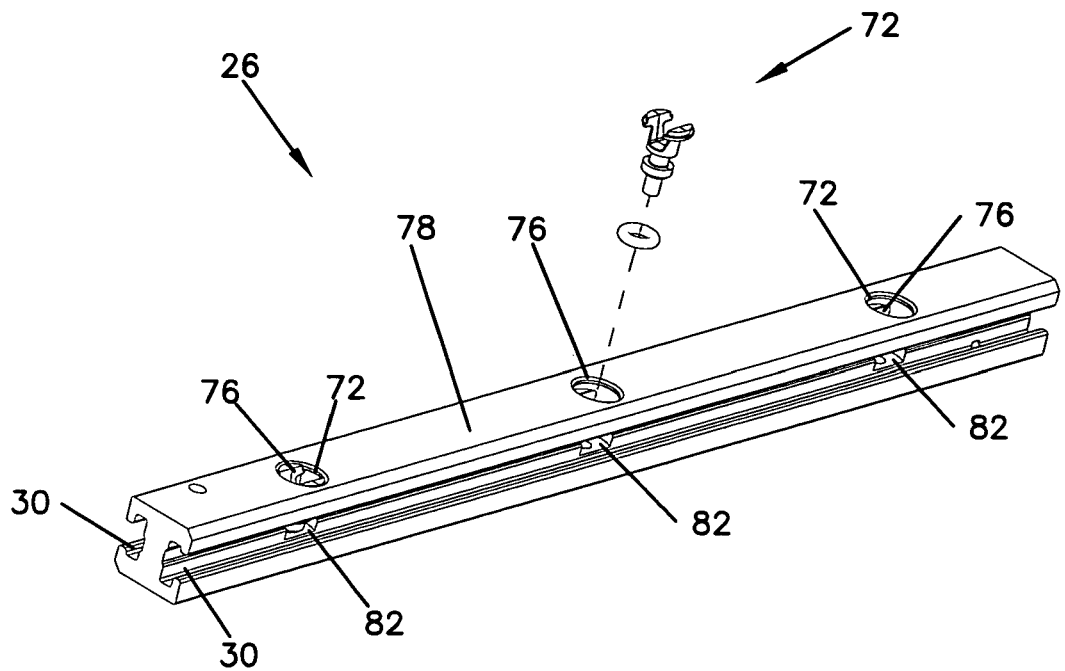
FIG. 4 is a top perspective view of a center rail of the drawer slide shown in FIG. 2.

FIG. 4 illustrates one of the center rails (e.g. 26) in isolation. The first and second center rails 22, 26 of the drawer slide 10 are mirror images of one another. The following description of the second center rail 26 in reference to FIG. 4 applies similarly to the first center rail 22.

Referring to FIG. 4, each of the center rails 22, 26 includes longitudinal grooves 30 located on opposite sides of the rail. The longitudinal grooves 30 extend from a first end 32, 34 (FIG. 2) of each of the center rails 22, 26 to a second end 36, 38 of the center rails. The longitudinal grooves 30 located on opposite sides of the center rails 22, 26 generally define an I-shaped cross-section, as shown in FIG. 5.

The longitudinal grooves 30 of each of the center rails 22, 26 are configured to provide an interlocking connection with the hub rail 24 and one of the first and second side rails 20, 28 of the drawer slide 10. In particular, the center rails include upper and lower retaining lips or edges 54 that partially define the grooves 30. The retaining edges 54 interlock with the hub rail 24 and the side rails 20, 28 and so that the hub and side rails 24, 20, 28 are laterally retained relative to the center rails 22, 26.

Figure 5:
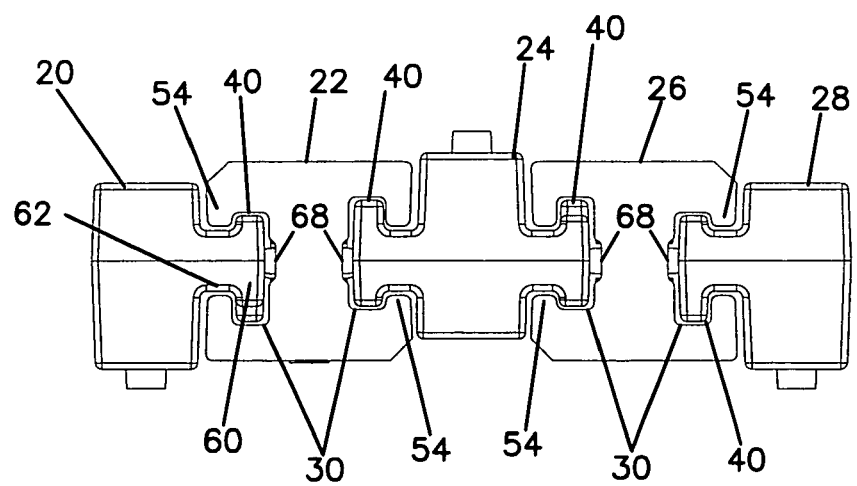
FIG. 5 is a front elevation view of the drawer slide of FIG. 2.

Referring to FIG. 5, the grooves 30 of the center rails 22, 26 are configured for corresponding receipt of interlocking constructions or tongues 40 of the hub rail 24 and the side rails 20, 28. The tongues 40 of the first and second side rails 20, 22 extend from a first end 42, 44 (FIG. 3) of each of the side rails 20, 28 to a second end 46, 48 of the side rails. Each of the first and second side rails 20, 28 has only a single tongue 40 that interlocks with a corresponding groove 30 of the associated center rail 22, 26. The hub rail 24 includes two tongues 40 disposed on opposite sides of the hub rail that interlock with corresponding grooves 30 of each of the center rails 22, 26. The tongues 40 of the hub rail 24 also extend from a first end 50 (FIG. 3) of the hub rail 26 to a second end 52 of the hub rail.

As shown in FIG. 5, preferably, the interlocking construction or tongue 40 of each of the side rails 20, 28 and hub rail 24 corresponds to the cross-sectional area of the grooves 30 of the center rails 22, 26. That is, the tongue 40 has a corresponding cross-sectional shape to that of the cross-sectional area of the groove 30. By this configuration, the interlocking connection between the each of the five rails is more structurally engaged and lessens wobble or the likelihood of a lose-fit, which can occur in conventional sliding arrangements not having corresponding cross-sections.

Figure 6:
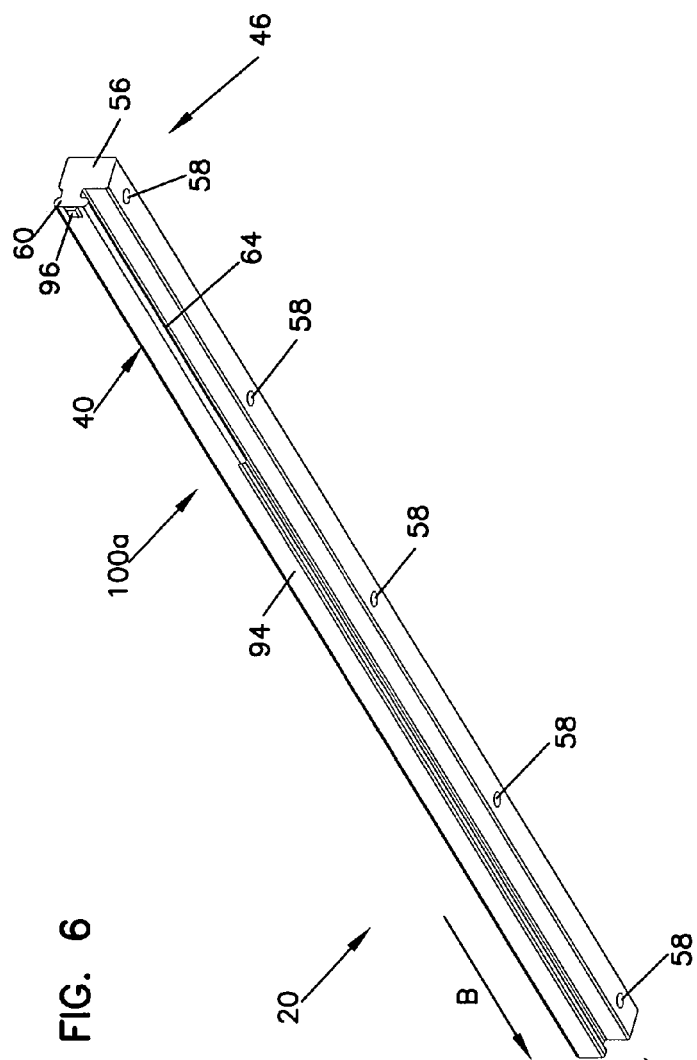
FIG. 6 is a perspective view of a side rail of the drawer slide shown in FIG. 2.

Referring now to FIG. 6, one of the side rails (e.g. 20) is illustrated in isolation. For purposes of clarity, molding recesses formed during the manufacture of the rail, shown in FIGS. 2 and 3, are not shown in FIG. 6. The first and second side rails 20, 28 of the drawer slide 10 are mirror images of one another. The following description of the first side rail 20 in reference to FIG. 6 applies similarly to the second side rail 28.

As shown in FIG. 6, the first side rail 20 includes a primary rail portion 56. The primary rail portion 56 defines mounting structures 58 that can be used to fasten or secure the first side rail 20 to one of the drawer 14 or chassis. The mounting structures 58 can include through holes, threaded holes, or any other type of structure for securing the rail to the drawer 14.

The tongue 40 of each of the side rails 20, 28 extends outward from the primary rail portion 56 (FIG. 6). As shown in FIG. 5, the cross-sectional configuration of the tongue 40 includes an elongated element 60 attached to the primary rail portion 56 by a neck 62. The elongated element 60 of the tongue 40 has a shape and configuration that interlocks with retaining edges 54 of the groove 30 of the center rail (e.g. 22) so that the side rail and the center rail cannot laterally disengage from one another.

Figure 7:
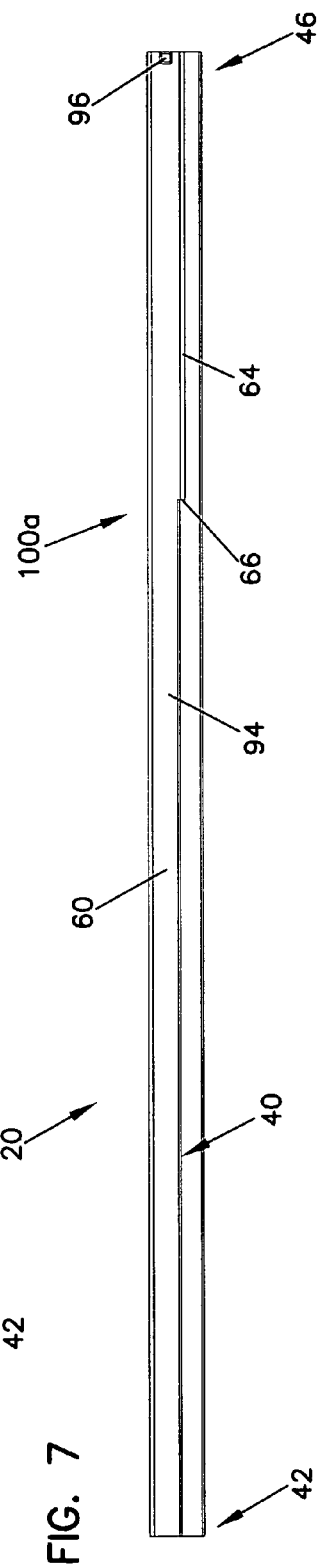
FIG. 7 is a side elevation view of the side rail of FIG. 6.

Referring now to FIGS. 6 and 7, the elongated element 60 of the tongue 40 extends from the first end 42 of the side rail 20 to the second end 46. A stop structure 64 is located along a section of the elongated element 60. In the illustrated embodiment, the stop structure 64 extends along a lower part of the elongated portion 60 adjacent to the second end 46 of the first side rail 20. As will be described in greater detail hereinafter, the stop structure 64 interacts with the center rail to provide a positive stop of relative sliding movement between the side rail and the associated center rail (e.g. 22). It is noted that the hub rail 24 includes similar stop structure on each of the two tongues as previously described with respect to the tongues of the side rails 20, 28.

In the illustrated embodiment, the drawer slide 10 includes first and second spools 70, 72 (FIGS. 2 and 3) that provide synchronized sliding movement between adjacent ones of each of the slide members (20, 22, 24, 26, 28) of the drawer slide. That is, one of the adjacent slide members travels at half-speed relative to a travel speed of the other of the adjacent slide members.

For example, the drawer slide 10 provides synchronized sliding movement between the first side rail 20 and the first center rail 22, when the hub rail 24 is stationary. In particular, when the drawer 14 slides relative to the chassis 16 and the first spool 70 rotates between the first side rail 20 and the hub rail 24, the first side rail 20 travels at full speed and causes the first center rail 22 to travel at half speed. The drawer slide 10 also provides synchronized sliding movement between the second side rail 28 and the second center rail 26, when the hub rail 24 is stationary. In particular, when the drawer 14 slides relative to the chassis 16 and the second spool 72 rotates between the second side rail 28 and the hub rail 24, the second side rail 28 travels at full speed and causes the second center rail 26 to travel at half speed. Synchronized sliding movement is further provided between the hub rail 24 and both of either of the center rails 22, 26 when the respective side rail 20, 28 is stationary. The synchronized movement of the drawer slide 10 can be utilized to provide half-speed movement of a radius limiter coupled to the drawer slide 10, for example. Further details of such a radius limiter arrangement are described in U.S. Publication 2005/0025444; previously incorporated herein by reference.

Referring again to FIG. 2, the synchronized sliding movement of the present drawer slide 10 is provided by at least the first wheel or spool 70, which is arranged to contact and rotate between the first side rail 20 and the hub rail 24, and the second wheel or spool 72, which is arranged to contact and rotate between the second side rail 28 and the hub rail 24. The first spool 70 is located within an aperture 74 formed in the first center rail 22. The second spool 72 is located within an aperture 76 formed in the second center rail 26. In the illustrated embodiment, each of the first and second center rails 22, 26 includes three apertures 74, 76 and three corresponding spools 70, 72. The number of spools provided can be modified to accommodate the various structural requirements of the drawer slide. For example, in applications utilizing longer rail members, more spools can be provided to ensure the structural sliding stability of the drawer slide, as compared to applications utilizing shorter rail members and requiring only one spool per center rail member. In addition, as will be described in greater detail hereinafter, the five-rail drawer slide can also be provided without spools (see FIG. 13).

In the illustrated embodiment, the spools 70, 72 are self-contained within the drawer slide 10; thereby, placement of the drawer slide 10 relative to the drawer 14 and chassis 16 is not limited by spool diameter or contact between the spools and the chassis. The self-contained feature adapts well to drawer arrangements having different drawer depths.

Figure 8:
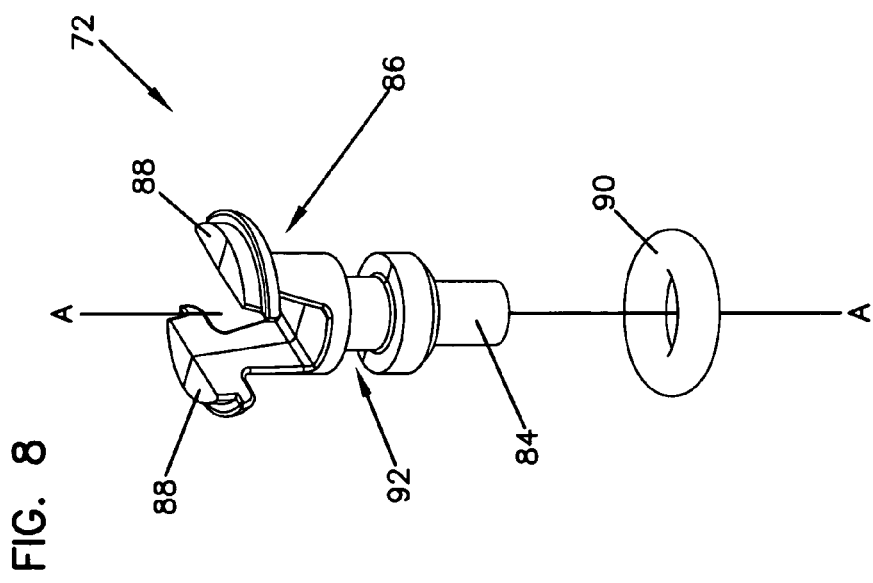
FIG. 8 is a perspective view of a spool shown in FIG. 4.

Referring now to FIGS. 4 and 8, the spools (e.g. 72) are configured to rotate about an axis of rotation A that is perpendicular to the direction of sliding movement of the drawer slide 10. More specifically, the axis of rotation A is generally perpendicular, in a vertical direction, relative to the horizontal direction of sliding movement of the drawer 14.

Providing self-contained spools 70, 72 that rotate about the vertical axis A relative to horizontal movement of the drawer 14 reduces problems associated with manufacturing and assembly of the drawer arrangement 14. For example, in prior arrangements, a wheel was oriented to have a horizontal axis of rotation. In these prior arrangements, the wheel rode on or was in direct contact with the drawer or chassis. Accordingly, sheet metal flatness, parallelism, and tolerance stack ups had to be carefully controlled because it was critical to wheel engagement. In addition, the wheel would push the drawer and its components, for example, upwards towards the drawer enclosure due to the orientation of the wheel, which sometimes caused interference problems. The present spool design minimized or eliminated many of these problems.

Still referring to FIGS. 4 and 8, the apertures (e.g. 76) of the center rails (e.g. 26) extend through the center rail 22 from a top surface 78 to a bottom surface 80 (FIG. 3). The apertures 76 are sized such that first and second windows or transverse apertures 82 are provided in each of the grooves 30 of the center rails.

Referring to FIG. 8, each of the spools (e.g., 72) generally includes an axle 84 and a retaining cap 86. The retaining cap 86 includes two spaced apart cap sections 88. The spaced-apart sections 88 are flexible so that the retaining cap 86 can be flexed and snap-fit into the aperture 76 of the central rail 26.

In the preferred embodiment, the spools includes an o-ring or compressible ring 90 that is positioned within a retaining groove 92 of the spool axle 84. When the spool 72 is placed within the aperture 76 of the center rail 26, the o-ring 90 extends into the grooves 30 of the center rail 26 through the transverse apertures 82 to contact the tongues 40 of the side rail (e.g. 28) and the hub rail 24.

In use, as the interlocked rails linearly travel relative to one another, the o-ring 90 and spool 70 rotate by contact of the o-ring 90 with an engagement surface (e.g. 94, FIG. 6) of the tongues 40 of the rails. In some embodiments, the engagement surfaces 94 of the rails 20, 24, 28 may have a particular surface finish to enhance engagement between the o-ring 90 and the surface 94 of each of the rails. Preferably, the o-ring 90 is under some compression sufficient enough to maintain the drawer 14 in a fixed position when a user has released the drawer 14 in a partially-opened or partially-closed position. This addresses problems found in conventional drawer slides having a ball-bearing arrangement where a drawer may unintentionally continue to roll open or closed due to the weight of the drawer.

Referring again to FIGS. 2 and 3, the drawer slide 10 includes a number of positive stop arrangements 100a-d that prevent the drawer 14 from becoming separated from the chassis 16 when sliding the drawer 14 open. The remainder of the detailed description refers only the positive stop arrangement between the first side rail 20 and the first center rail 22, however, the disclosure is applicable to the first center rail 22 and the hub rail 24, the hub rail 24 and the second center rail 26, and the second center rail 26 and the second side rail 28, as well. That is, the positive stop arrangements 100a-d similarly limit motion between each of the adjacent, interconnected rail members 20, 22, 24, 26, 28 of the drawer slide 10.

Referring again to FIGS. 6 and 7, each of the positive stop arrangements 100a-d is provided by engagement of the stop structure 64 located on the tongues 40 of each of the rails with stops 102 (FIG. 9) located within each of the grooves 30 of the first and second center rails 22, 26. The stops 102 are disposed in each groove 30 of the center rails at one of the first and second ends of the rails 22, 26. That is, as shown in FIG. 3, one stop 102a (partially shown through the bottom surface 80 of the center rail 22) is located in one of the grooves 30 at the first end 32 of the first center rail 22, while another stop 102b (FIG. 2, partially shown through the top surface 78 of the center rail 22) is located in the other of the grooves at the second end 36 of the first central rail. The second central rail 26 is similarly configured with stops 102.

Figure 9:
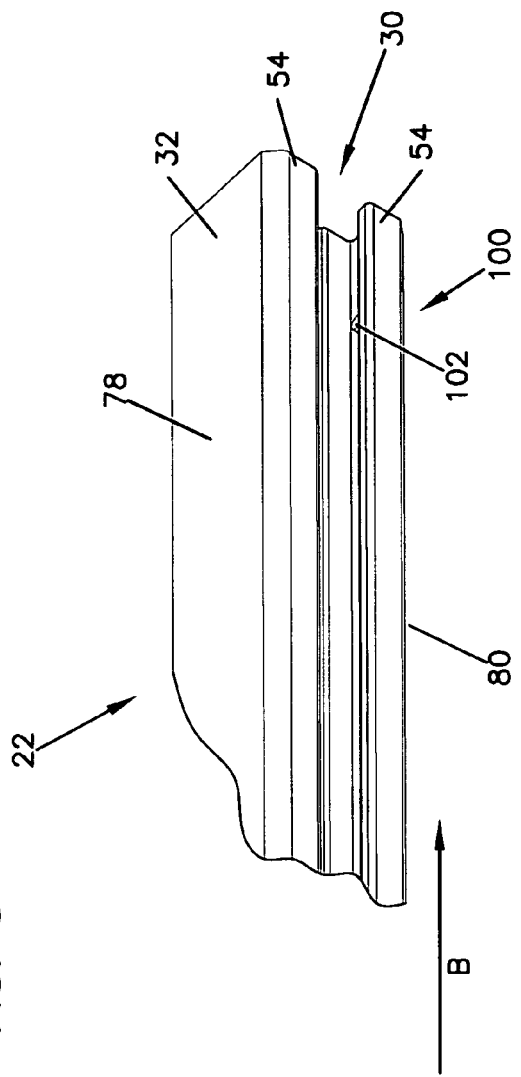
FIG. 9 is a partial perspective view of an end of another center rail of the drawer slide shown in FIG. 2.

When the first side rail 20, for example, slides relative to the first center rail 22 in a direction represented by arrow B in FIGS. 2, 6, and 9, a shoulder 66 (FIG. 7) of the stop structure 64 of the first side rail 20 contacts the stop 102 shown in FIG. 9. The contact between the stop 102 and the stop structure 64 prevents linear separation of the first side rail 20 and the first center rail 22. As can be understood, in use, the stops 102 of the each of the center rails 22, 26 contacts each of the shoulders (e.g. 66) of the side rails 20, 28, and hub rail 24 when the drawer 14 is pulled out to the fully-open position. These engagements positively stop further movement of the drawer 14 and prevent the drawer 14 from separating from the chassis 16.

Referring back to FIG. 5, each of the grooves 30 of the first and second center rails 22, 26 has a smaller central indentation or groove 68 extending along the length of the rail. The smaller central groove 68 is configured to accommodate a projection or catch 96 (FIGS. 6 and 7) located adjacent the stop structure (e.g., 64) of each of the first and second side rails 20, 28 and the hub rail 24. The catch 96 of each of the rails 20, 28, 24 slides within the smaller central grooves 68 of the center rails 22, 26. The catch 96 is sized and configured such that the catch will slidably move within the smaller central groove 68 without interference, until the catch 96 contacts the ring 90 of the spool 70, 72. Preferably, the catch 96 is positioned and sized to provide sufficient interference with the ring 90 to cause a slight pause in sliding movement of the drawer. Because of the compliance in the ring 90, the catch 96 can still be pulled past or beyond the ring 90. The pause in movement, caused by the interference, indicates to a user that the drawer 14 is reaching a fully-opened position. The positive stop arrangement 100 previously described subsequently limits the sliding movement of the drawer 14 beyond the fully-opened position. As can be understood, in the alternative embodiment where no spools are used in the five-rail drawer slide (see FIG. 13), the smaller groove 68 and the catch 96 can be omitted from the drawer slide design.

Figure 12:
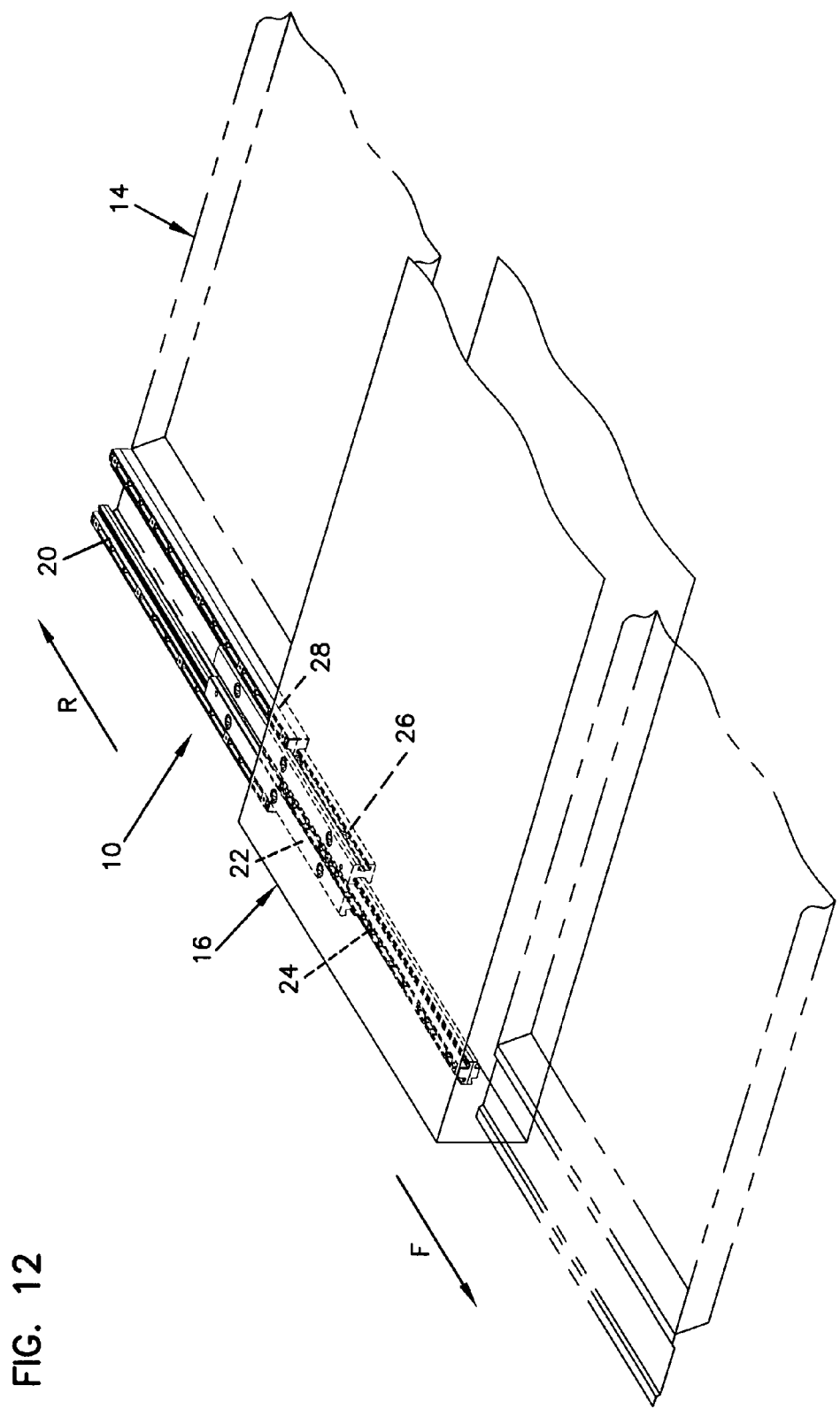
FIG. 12 is a front perspective view of the drawer slide of FIG. 2, shown in use with a drawer in the second mounting configuration, the drawer moved in a rearward direction.

In the embodiment of FIG. 1, the module 12 includes two opposingly positioned drawer slides 10 to provide sliding motion between the drawer 14 and the chassis 16. FIGS. 10-12 illustrate two configurations of how the drawer slides 10 (only one shown) can be mounted to provide sliding movement of the drawer 14 relative to the chassis 16.

Referring to FIG. 10, in a first mounting configuration, each of the first and second side rails 20, 28 is affixed to one of the drawer 14 (schematically shown in dashed line) and the chassis 16 (schematically shown), while the hub rail 24 is free to slide. In the illustrated embodiment, the first side rail 20 is secured to the drawer 14, the second side rail 28 is secured to the chassis 16, and none of the first and second center rails 22, 26 or the hub rail 24 is secure to either of the drawer or the chassis. (See also FIG. 10A showing the mounted/secured rails with a reference letter M.)

When the drawer slide 10 is mounted in this first configuration, the drawer can be moved from the closed position (as shown in FIG. 1) to the open position (as shown in FIG. 10) in a forward direction F. The five slide members (20, 22, 24, 26, and 28) of the present drawer slide 10 permit the drawer to travel a greater distance than conventional drawer slides having only two or three slide components.

In particular, the drawer slide 10 permits the drawer to travel a distance (2×L) that is approximately 2-times a retracted length (L) of the slide, as opposed to a distance that is only 1-times the retracted length of a conventional slide having only two or three slide components. In other words, the drawer slide 10 has an expanded length that is approximately 3-times greater than the retracted length L of the drawers slide. The retracted length L is defined as the length of the drawer slide 10 when the drawer slide is retracted, such as shown in FIG. 2. The five slide members of the present drawer slide permit greater slide extension to provide better access to the interior of a drawer, or to accommodate a deeper drawer having an interior that is otherwise difficult to access with conventional drawer slides.

In contrast, in a second mounting configuration shown in FIGS. 11 and 12, the drawer slide 10 permits the drawer to be moved from the closed position to the open position in both of either the forward direction F (FIG. 11) and a rearward direction R (FIG. 12). Referring to FIGS. 11 and 12, in the second mounting configuration, each of the first and second side rails 20, 28 is affixed to the drawer 14, while the hub rail 24 is affixed to the chassis 16. (See also FIG. 11A showing the mounted/secured rails with a reference letter M.)

When the drawer slide 10 is mounted in this second configuration, the drawer can be moved from the closed position (as shown in FIG. 1) to the open position (as shown in FIGS. 11 and 12) in either one of both the forward direction F and the rearward direction R. The forward and rearward drawer access is advantageous in application utilizing chassis with rear cable entry, for example.

When the drawer slide 10 is mounted in the first configuration, the drawer 14 opens only in the forward direction F; yet provides increased slide extension for greater drawer access. The five slide members (20, 22, 24, 26, and 28) of the present drawer slide 10 can also be mounted in the second configuration to permit the drawer to travel forward or rearward to provide more adaptable access to the interior of a drawer. Depending upon the user's needs, the drawers of a system can be configured to provide extended open access to the drawer interior, or to provide forward and rearward access to the drawer interior, with use of the same drawer slide 10.

Figure 13:
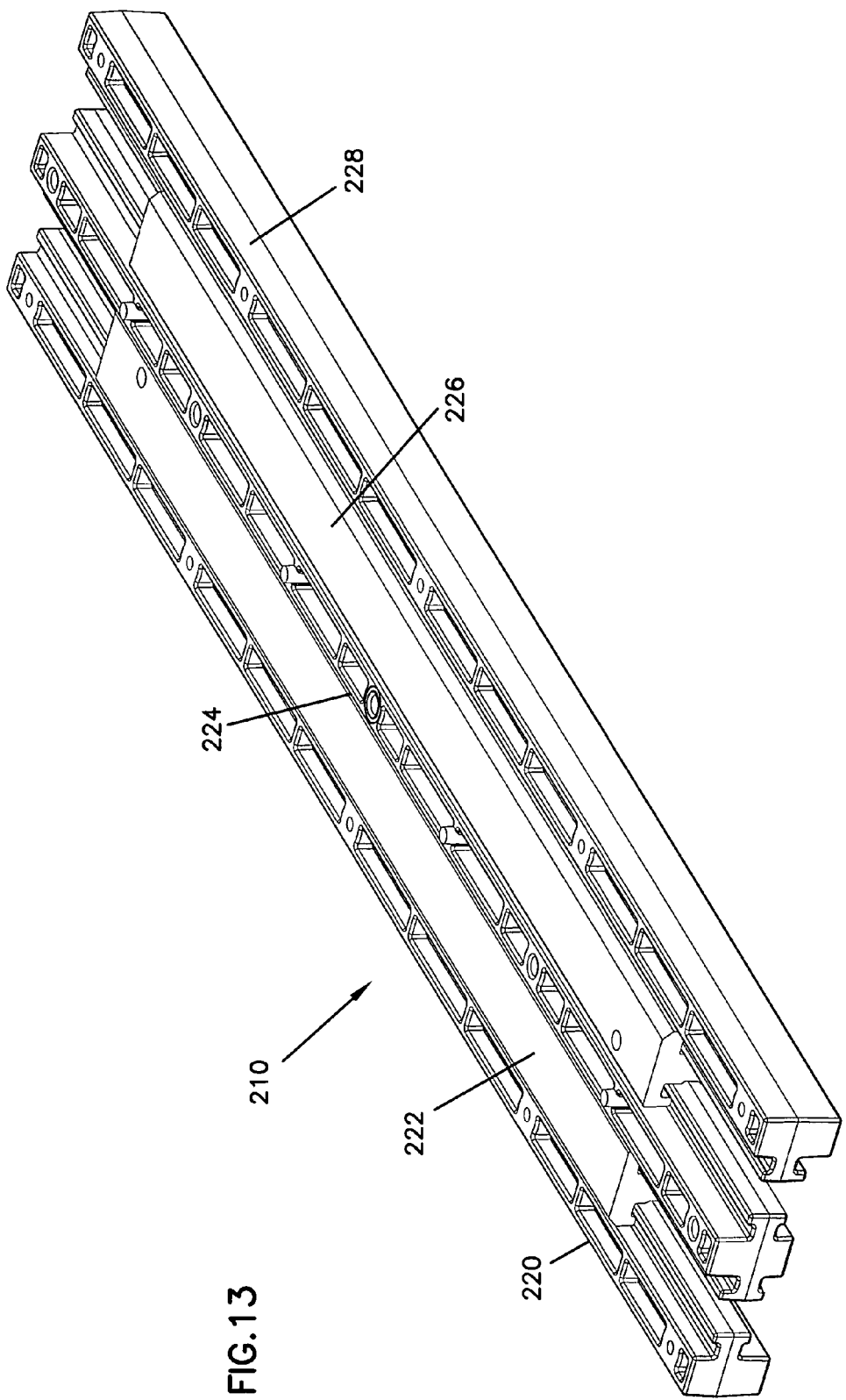
FIG. 13 is a top perspective view of another embodiment of a drawer slide, according to the principles of the present disclosure, which can be used in the drawer arrangement of FIG. 1, and used with a drawer in the configurations shown in FIGS. 10-12.

Referring now to FIG. 13, a second embodiment of a drawer slide 210 is illustrated. This embodiment incorporates all the features of the previously described drawer slide embodiment (i.e., 10), with the exception of the spools (e.g. 70, 72) and associate spool structures. In applications where synchronized movement between the rails is not needed, the drawer slide 210 can simply include the at least five slide members 220, 222, 224, 226, 228 slidably engaged with one another as previously described. The drawer slide 210 functions in the same manner as previously described so that a user can mount the drawer slide in both of either of the first mounting configuration and the second mounting configuration to permit sliding movement in only a forward direction, or in both a forward direction and a rearward direction.

The above specification provides a complete description of the present invention. Since many embodiments of the invention can be made without departing from the spirit and scope of the invention, certain aspects of the invention resides in the claims hereinafter appended.

What is claimed is:

1. A cable management module, comprising:
   a) a drawer and a chassis; and
   b) a drawer slide interconnected to each of the drawer and the chassis, the drawer slide being configured to provide sliding movement of the drawer relative to the chassis;
   c) wherein the drawer slide provides operable sliding movement when mounted to each of the drawer and the chassis in a first mounting configuration and also provides operable sliding movement when mounted to each of the drawer and the chassis in a second mounting configuration, when the drawer slide is mounted in the first mounting configuration, the drawer opens from a closed drawer position in only a first direction, when the drawer slide is mounted in the second mounting configuration, the draw opens from the closed drawer position in both a first direction and a second opposite direction.

2. The module of claim 1, wherein the drawer slide includes:
   a) two center rails, each of the center rails including longitudinal grooves extending from a first end of the center rail to a second end of the center rail;
   b) a hub rail having interlocking constructions that slidably engage with one of the longitudinal grooves of each of the two center rails; and
   c) first and second outer rails having interlocking constructions that slidably engage with another of the longitudinal grooves of each of the two center rails.

3. The module of claim 2, wherein, in the first mounting configuration, the first outer rail is affixed to one of the drawer and the chassis and the second outer rail is affixed to the other of the drawer and the chassis so that the drawer opens from the closed drawer position in only the first direction.

4. The module of claim 2, wherein, in the second mounting configuration, the hub rail is affixed to the chassis and each of the first and second outer rails is affixed to the drawer so that the drawer opens from the closed drawer position in both of either the first direction and the second opposite direction.

5. The module of claim 2, wherein the drawer slide further includes a first spool arranged to contact each of the hub rail and the first outer rail when the first outer rail slides relative to the hub rail, and a second spool arranged to contact each of the hub rail and the second outer rail when the second outer rail slides relative to the hub rail.

6. The module of claim 5, wherein the first and second spools of the drawer slide provide synchronized movement of adjacent ones of each of the first and second outer rails, the hub rail, and the two center rails.

7. The module of claim 5, wherein each of the first and second spools has an axis of rotation perpendicular to the first and second directions of sliding movement of the drawer.

8. A method of assembling a cable management module having a drawer and a chassis, the method of assembling comprising the steps of:

a) providing a drawer slide that accommodates sliding movement of the drawer relative to the chassis, the drawer slide including at least five rail members interconnected to one another;
b) selectively mounting a first one of the five rail members to the chassis, including:
   i) mounting a middle hub rail to the chassis if only forward drawer opening movement is desired; and
   ii) mounting an outer rail to the chassis if both forward and rearward drawer opening movement is desired;
c) mounting a second one of the five rail members to the drawer; and
d) sliding the drawer relative to the chassis from a closed position to an open forward position in a first sliding direction.

9. The method of claim 8, wherein the outer rail is mounted to the drawer, the method further including sliding the drawer relative to the chassis from the closed position to an open rearward position in a second sliding direction opposite the first direction.

10. The method of claim 9, further including mounting a third one of the five rail members to the drawer.

11. The method of claim 9, wherein the steps of sliding the drawer in the first sliding direction and sliding the drawer in the second sliding direction each including sliding adjacent members of the five rail members in a synchronized manner.

12. The method of claim 8, wherein the step of providing the drawer slide includes:
a) slidably engaging two center rails of the five rail members with the middle hub rail of the five rail members; and
b) slidably engaging the outer rail and another outer rail with one of each of the two center rails.

13. A drawer slide that mounts to each of a drawer and a chassis to provide sliding movement of the drawer relative to the chassis, the drawer slide comprising:
a) two center rails, each of the center rails including longitudinal grooves extending from a first end of the center rail to a second end of the center rail;
b) a hub rail having interlocking constructions that slidably engage with one of the longitudinal grooves of each of the two center rails; and
c) first and second outer rails having interlocking constructions that slidably engage with another of the longitudinal grooves of each of the two center rail;
d) wherein the drawer slide is constructed to mount to the drawer and chassis in a first configuration that allows a user to open the drawer in only a first direction, and wherein the drawer slide is also constructed to mount to the drawer and chassis in a second configuration that allows a user to open the drawer in both the first direction and a second opposite direction.

14. The drawer slide of claim 13, wherein the longitudinal grooves of each of the two center rails and the interlocking constructions of each of the hub rail and the outer rails are correspondingly sized such that only one of the interlocking constructions can be received within each of the longitudinal grooves.

15. The drawer slide of claim 13, further including a stop arrangement configured to prevent linear separation of the first and second outer rails from the two center rails, and to prevent linear separation of the two center rails from the hub rail.

16. The drawer slide of claim 13, further including:
a) a first spool arranged to contact each of the hub rail and the first outer rail when the first outer rail slides relative to the hub rail; and
b) a second spool arranged to contact each of the hub rail and the second outer rail when the second outer rail slides relative to the hub rail.

17. The drawer slide of claim 16, wherein each of the first and second spools has an axis of rotation perpendicular to a direction of sliding movement of the first and second outer rails.

18. The drawer slide of claim 16, wherein the first spool is disposed within an aperture formed in a first center rail of the two center rails, and wherein the second spool is disposed within an aperture formed in a second center rail of the two center rails.

19. The drawer slide of claim 18, wherein in each of the first and second center rails includes a plurality of spools, the plurality of spools being arranged to contact each of the hub rail and the respective outer rail when the outer rail slides relative to the hub rail.

20. The drawer slide of claim 18, wherein the first spool permits the first center rail to travel at half-speed relative to a travel speed of the first outer rail when the hub rail is held stationary; and wherein the second spool permits the second center rail to travel at half-speed relative to a travel speed of the second outer rail when the hub rail is held stationary.

21. A drawer slide that mounts to each of a drawer and a chassis to provide sliding movement of the drawer relative to the chassis, the drawer slide comprising:
a) five rail members that interlock with one another, the five rail members including:
   i) a hub rail;
   ii) first and second center rails, each of the first and second center rails being interlocked with the hub rail; and
   iii) first and second outer rails, the first outer rail being interlocked with the first center rail, and the second outer rail being interlocked with the second center rail;
b) wherein each of the five rail members slide relative to one another;
c) wherein the drawer slide is capable of mounting in a first configuration that allows a user to open the drawer an expanded distance in only a first direction, and wherein the drawer slide is also capable of mounting in a second configuration that allows a user to open the drawer a non-expanded distance in both the first direction and a second opposite direction.

22. A cable management module, comprising:
a) a chassis;
b) a drawer positionable within the chassis; and
c) a drawer slide having a retracted length; the drawer slide being interconnected to each of the drawer and the chassis to provide sliding movement of the drawer relative to the chassis;
d) wherein the drawer slide is constructed to mount to the drawer and chassis in a first mounting configuration and is also constructed to mount to the drawer and chassis in a second mounting configuration, when the drawer slide is mounted in the first mounting configuration, the drawer travels outward from the chassis a distance of approximately 2-times the retracted length of the drawer slide in only a first direction, when the drawer slide is mounted in the second mounting configuration, the drawer travels outward from the chassis in both the first direction and a second direction opposite the first direction.

23. The module of claim 22, wherein the drawer slide includes five rail members disposed in sliding engagement with one another, and when the drawer slide is mounted in the second mounting configuration, the five rail members include: a first outer rail affixed to one of the drawer and the chassis, and a second outer rail affixed to the other of the drawer and the chassis.

24. The module of claim 23, wherein the five rail members include:
   a) two center rails, each of the center rails including longitudinal grooves extending from a first end of the center rail to a second end of the center rail;
   b) a hub rail having interlocking constructions that slidably engage with one of the longitudinal grooves of each of the two center rails; and
   c) the first and second outer rails, each of the first and second outer rails having interlocking constructions that slidably engage with another of the longitudinal grooves of each of the two center rails.

25. The module of claim 24, wherein the drawer slide further includes a first spool arranged to contact each of the hub rail and the first outer rail when the first outer rail slides relative to the hub rail, and a second spool arranged to contact each of the hub rail and the second outer rail when the second outer rail slides relative to the hub rail.

26. The module of claim 25, wherein the first and second spools of the drawer slide provide synchronized movement of adjacent ones of each of the first and second outer rails, the hub rail, and the two center rails.

27. The module of claim 25, wherein each of the first and second spools has an axis of rotation perpendicular to the first direction of sliding movement of the drawer.

28. A cable management module, comprising:
   a) a chassis;
   b) a drawer positionable within the chassis; and
   c) a drawer slide interconnected to each of the drawer and the chassis, the drawer slide being configured to provide opening sliding movement of the drawer relative to the chassis in only a first direction when mounted in a first mounting configuration, the drawer slide also being configured to provide opening sliding movement of the drawer relative to the chassis in both a first direction and a second opposite direction when mounted in a second mounting configuration.

29. The module of claim 28, wherein the drawer slide includes five rail members disposed in sliding engagement with one another, the five rail members including: a hub rail affixed to the chassis, and first and second outer rails affixed to the drawer.

30. The module of claim 29, wherein the first outer rail includes a first stop to limit sliding movement of the drawer relative to the chassis in the first direction, and wherein the second outer rail includes a second stop to limit sliding movement of the drawer relative to the chassis in the second opposite direction, when the drawer slide is mounted in the second mounting configuration.

31. The module of claim 29, wherein the five rail members include:
   a) two center rails, each of the center rails including longitudinal grooves extending from a first end of the center rail to a second end of the center rail;
   b) the hub rail, the hub rail having interlocking constructions that slidably engage with one of the longitudinal grooves of each of the two center rails; and
   c) the first and second outer rails, the first and second outer rails having interlocking constructions that slidably engage with another of the longitudinal grooves of each of the two center rails.

32. The module of claim 31, wherein the drawer slide further includes a first spool arranged to contact each of the hub rail and the first outer rail when the first outer rail slides relative to the hub rail, and a second spool arranged to contact each of the hub rail and the second outer rail when the second outer rail slides relative to the hub rail.

33. The module of claim 32, wherein the first and second spools of the drawer slide provide synchronized movement of adjacent ones of each of the first and second outer rails, the hub rail, and the two center rails.

34. The module of claim 32, wherein each of the first and second spools has an axis of rotation perpendicular to the first and second directions of sliding movement of the drawer.

35. The module of claim 22, wherein the drawer slide includes five rail members disposed in sliding engagement with one another, and when the drawer slide is mounted in the first mounting configuration, the five rail members include first and second outer rails affixed to the drawer, and a middle hub rail affixed to the chassis.

* * * * *